(12) United States Patent
Jaradi et al.

(10) Patent No.: US 11,702,025 B1
(45) Date of Patent: Jul. 18, 2023

(54) VEHICLE SEAT ARMREST WITH TRANSLATABLE AND PIVOTABLE BAR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/932,362

(22) Filed: Sep. 15, 2022

(51) Int. Cl.
*B60R 21/207* (2006.01)
*B60R 21/015* (2006.01)
*B60R 21/233* (2006.01)
*B60N 2/75* (2018.01)

(52) U.S. Cl.
CPC .............. *B60R 21/207* (2013.01); *B60N 2/79* (2018.02); *B60R 21/01512* (2014.10); *B60R 21/233* (2013.01)

(58) Field of Classification Search
None
See application file for complete search history.

(56) References Cited

U.S. PATENT DOCUMENTS

| | | | | |
|---|---|---|---|---|
| 5,730,458 A | * | 3/1998 | Byon | B60N 2/79 280/730.2 |
| 5,746,443 A | * | 5/1998 | Townsend | B60J 5/06 280/730.2 |
| 9,434,340 B2 | * | 9/2016 | Egusa | B60R 21/23138 |
| 10,343,644 B2 | * | 7/2019 | Dry | B60N 2/753 |
| 10,479,310 B2 | * | 11/2019 | Dry | B60N 2/79 |
| 10,899,303 B2 | * | 1/2021 | Nagasawa | B60N 2/75 |
| 2018/0281724 A1 | * | 10/2018 | Nagasawa | B60N 2/79 |

FOREIGN PATENT DOCUMENTS

| | | | | |
|---|---|---|---|---|
| DE | 10253472 A1 | * | 6/2004 | .......... B60R 21/207 |
| DE | 202006019786 U1 | * | 4/2007 | .......... B60R 21/207 |
| DE | 102017010794 A1 | * | 7/2018 | |
| DE | 102018121615 A1 | * | 3/2019 | ............ B60N 2/753 |
| DE | 102018203731 A1 | * | 9/2019 | |
| JP | 2018171991 A | * | 11/2018 | |
| KR | 101356198 B1 | | 1/2014 | |

* cited by examiner

*Primary Examiner* — Faye M Fleming
(74) *Attorney, Agent, or Firm* — Frank A. MacKenzie; Bejin Bieneman PLC

(57) ABSTRACT

An assembly includes a seat. The assembly includes an armrest adjacent the seat with the armrest being elongated along an axis. The assembly includes a bar supported by the armrest. The bar is translatable along the axis from a stowed position overlapping the armrest to a deployed position extended from the armrest. The bar is pivotable relative to the armrest in a seat-inboard direction from a non-pivoted position to a pivoted position. The assembly includes an airbag supported the bar. The airbag is inflatable from the bar to an inflated position when the bar is in the deployed position and the pivoted position.

20 Claims, 15 Drawing Sheets

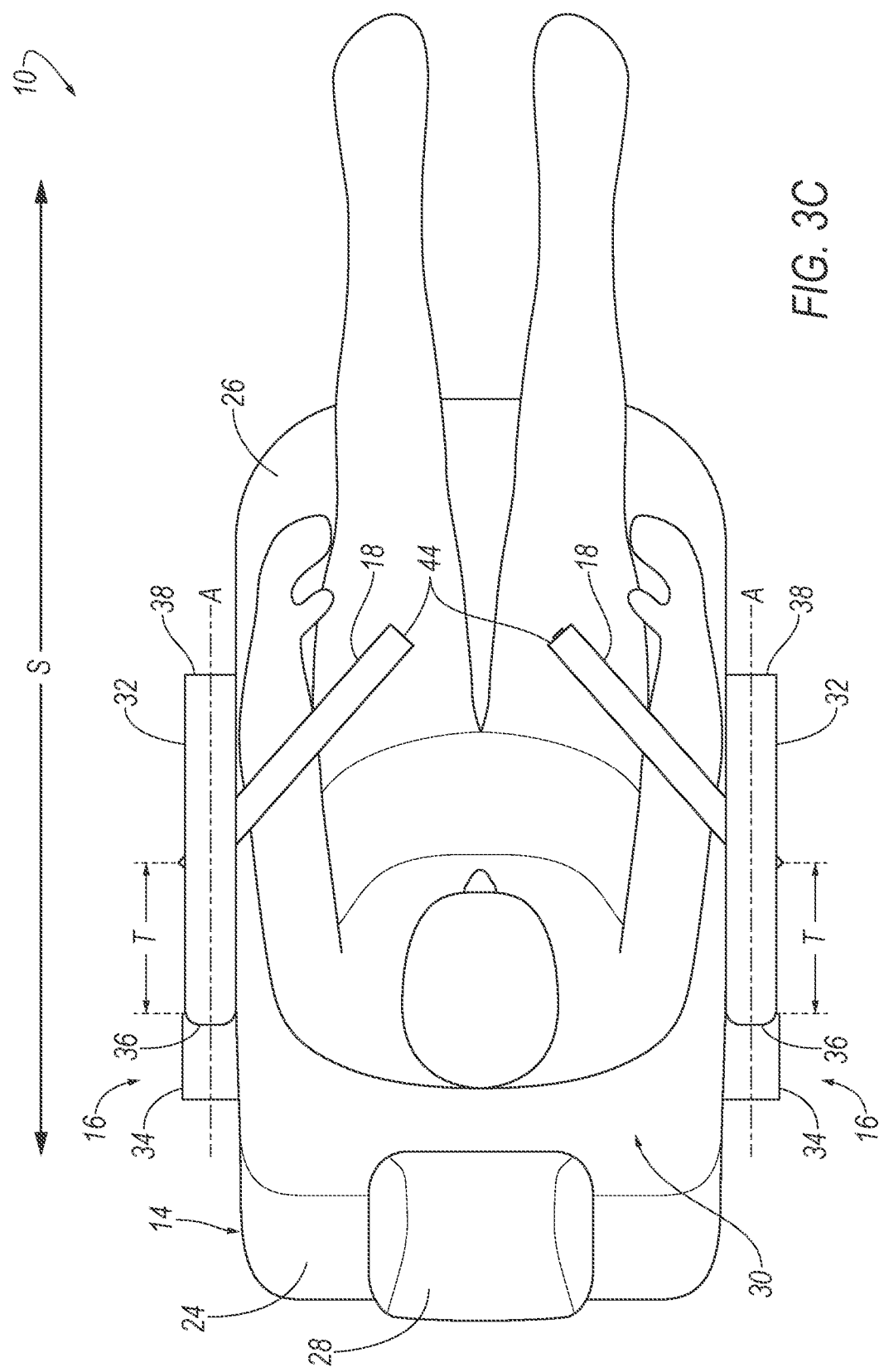

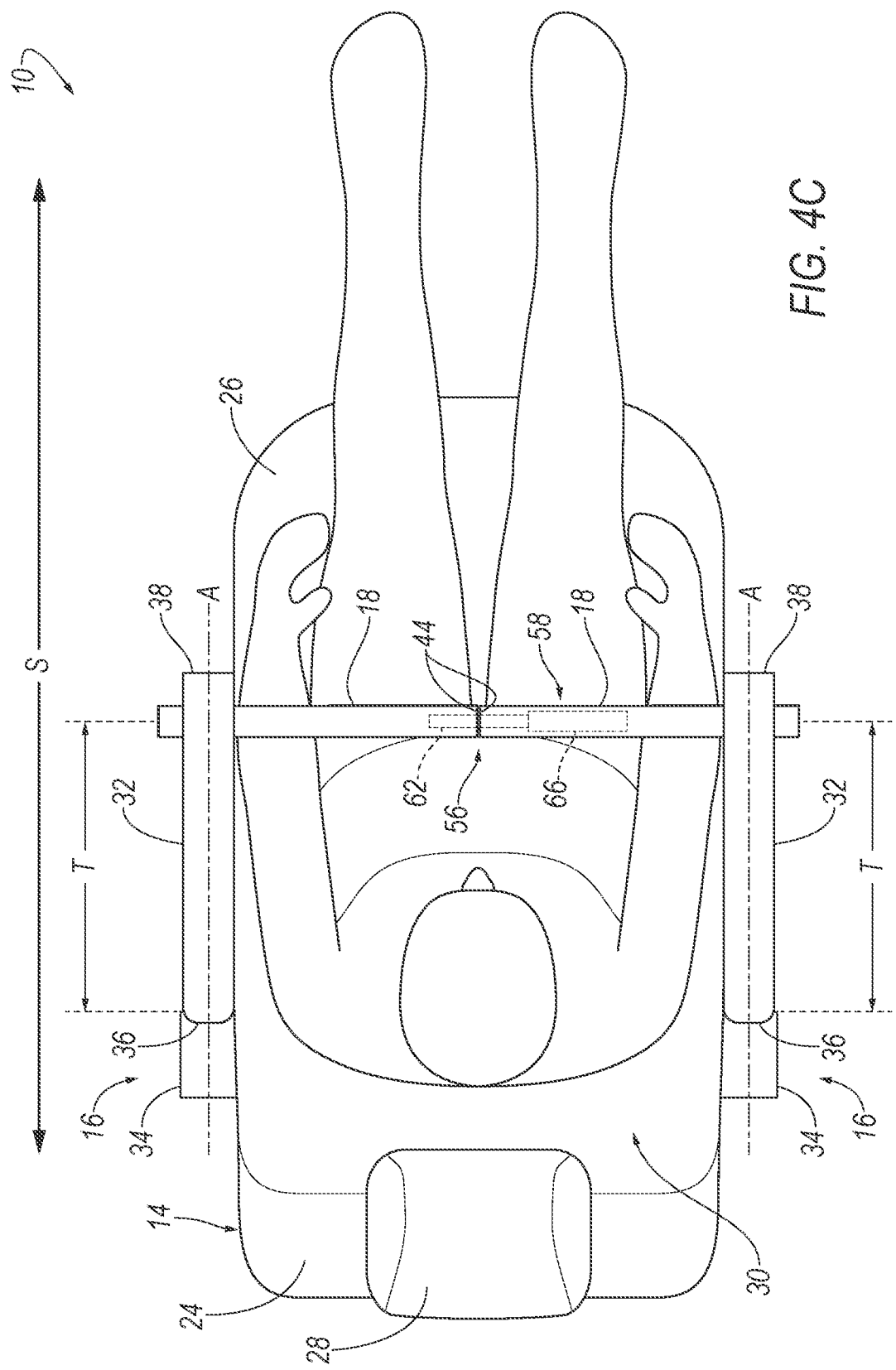

VEHICLE SEAT ARMREST WITH TRANSLATABLE AND PIVOTABLE BAR

BACKGROUND

Vehicles are equipped with airbags. In the event of certain impacts, an inflator activates and provides inflation medium to the airbags, and the airbags pressurize and act as supplemental restraints for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

BRIEF DESCRIPTION OF THE DRAWINGS

FIG. 3C is a top view of the vehicle seat shown in FIGS. 3A and 3B of the bars moving toward the deployed position and the pivoted position with the bars having a lock

FIG. 4C is a top view of the vehicle seat shown in FIGS. 4A and 4B with the bars in the deployed position and the pivoted position and the lock engaged.

DETAILED DESCRIPTION

Figure 1:
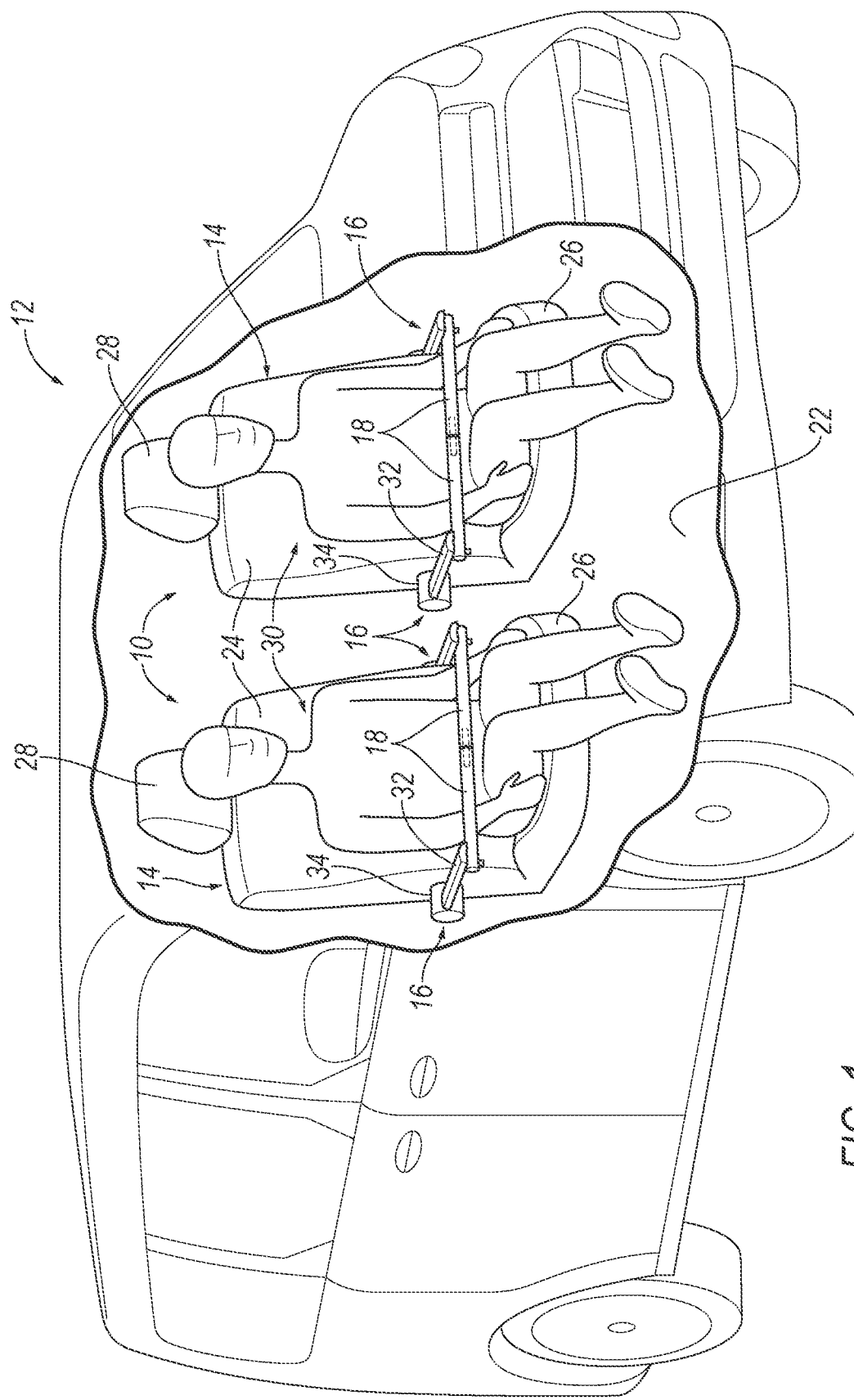
FIG. 1 is a perspective view of a vehicle having a pair of vehicle seats.

An assembly includes a seat. The assembly includes an armrest adjacent the seat with the armrest being elongated along an axis. The assembly includes a bar supported by the armrest. The bar is translatable along the axis from a stowed position overlapping the armrest to a deployed position extended from the armrest. The bar is pivotable relative to the armrest in a seat-inboard direction from a non-pivoted position to a pivoted position. The assembly includes an airbag supported the bar. The airbag is inflatable from the bar to an inflated position when the bar is in the deployed position and the pivoted position.

The assembly may include a second armrest supported by the seat. The second armrest may be spaced in a cross-seat direction from the armrest and the second armrest being elongated along a second axis spaced from the axis. The assembly may include a second bar supported by the second armrest. The second bar may be translatable along the second axis from a stowed position overlapping the second armrest to a deployed position. The second bar may be pivotable relative to the second armrest in a seat-inboard direction from a non-pivoted position to a pivoted position.

The airbag may be inflatable along the bar and the second bar to an inflated position when the bar and the second bar are each in the deployed position and the pivoted position. The airbag may surround the bar and the second bar in the inflated position.

The airbag may extend from the armrest to the second armrest when the airbag is in the inflated position.

The assembly may include a second airbag supported by the second bar. The second airbag may be inflatable along the second bar to an inflated position when the second bar is in the deployed position and the pivoted position.

Distal ends of the bar and the second bar may be adjacent each other in the cross-seat direction at a joint, the bar and the second bar being connectable to each other at the joint.

The assembly may include a lock between the bar and the second bar, the bar and the second bar being connectable to each other by the lock.

The lock may be a solenoid including a post movable along the bar and receivable by the second bar.

The bar may include a pin engageable with the armrest, the bar being pivotable about the pin to the pivoted position.

The pin may be translatable along the armrest to the deployed position.

The armrest may define a slot elongated along the axis, the pin being translatable along the slot to the deployed position.

The bar may include a pin translatable along the armrest to the deployed position.

The armrest may define a slot elongated along the axis, the pin being translatable along the slot to the deployed position.

The bar may be translatable in a seat-longitudinal direction from the stowed position to the deployed position.

The bar may be lockable in the pivoted position.

The seat may define an occupant seating area, the occupant seating area being between the seat and the bar when the bar is in the pivoted position and the deployed position.

A computer including a processor and a memory storing instructions executable by the processor to identify an occupant is seated in a seat of a vehicle, identify a size of the occupant, translate a bar supported by an armrest of a seat a translational distance from a stowed position to a deployed position, the translational distance from the stowed position to the deployed position being based on the size of the occupant of the seat; and pivot the bar in a seat-inboard direction to a pivoted position when the bar is in the deployed position along the armrest.

The instructions may include to translate a second bar supported by a second armrest of the seat from a stowed position to a deployed position, the translational distance from the stowed position to the deployed position being based on the size of the occupant of the seat, and pivot the second bar in the seat-inboard direction to a pivoted position when the bar is in the deployed position along the second armrest.

The bar may be lockable to the second bar.

The instructions may include to identify an impact to the vehicle and inflate an airbag supported by the bar, the airbag being inflatable along the bar to an inflated position when the bar is in the deployed position and the pivoted position.

With reference to the Figures, wherein like numerals indicate like parts throughout the several views, an assembly 10 for a vehicle 12 includes a seat 14. The assembly 10 includes an armrest 16 adjacent the seat 14 with the armrest 16 being elongated along an axis A. The assembly 10 includes a bar 18 supported by the armrest 16. The bar 18 is translatable along the axis A from a stowed position overlapping the armrest 16 to a deployed position extended from the armrest 16. The bar 18 is pivotable relative to the armrest 16 in a seat-inboard direction from a non-pivoted position to a pivoted position. The assembly 10 includes an airbag 20 supported the bar 18. The airbag 20 is inflatable from the bar 18 to an inflated position when the bar 18 is in the deployed position and the pivoted position.

The bar 18 may move to the pivoted position and the deployed position when an occupant is seated in the vehicle 12. The bar 18 may extend seat-forward of the occupant when the occupant is seated in the seat 14. When the occupant plans to exit the seat 14, the bar 18 may move to the stowed position and non-pivoted position. In the event of an impact to the vehicle 12, specifically certain impacts to the vehicle 12, the airbags 20 may inflate to the inflated position when the bar 18 is in the pivoted position and the deployed position.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, vehicle floor 22, vehicle roof, etc. The vehicle 12, specifically the body of the vehicle 12, includes a vehicle floor 22 and a vehicle roof (not numbered) spaced from the vehicle floor 22. The vehicle floor 22 may include upholstery, for example, carpet, and may have a class-A surface facing the passenger compartment, i.e., a surface specifically manufactured to have a high quality, finished, aesthetic appearance free of blemishes.

The vehicle 12 defines a passenger compartment (not numbered) to house occupants, if any, of the vehicle 12. The passenger compartment may extend across the vehicle 12, i.e., from one side to the other side of the vehicle 12. The passenger compartment includes a front end (not numbered) and a rear end (not numbered) with the front end being in front of the rear end during forward movement of the vehicle 12.

With continued reference to FIG. 1, the vehicle 12 may include one or more seats 14. Specifically, the vehicle 12 may include any suitable number of seats 14. The seats 14 are supported by the vehicle floor 22. The seats 14 may be arranged in any suitable arrangement in the passenger compartment. As in the example shown in the Figures, one or more of the seats 14 may be at the front end of the passenger compartment, e.g., a driver seat and/or a passenger seat. In other examples, one or more of the seats 14 may be behind the front end of the passenger compartment, e.g., at the rear end of the passenger compartment. The seats 14 may be movable relative to the vehicle floor 22 to various positions, e.g., movable fore-and-aft and/or cross-vehicle. The seat 14 may be of any suitable type, e.g., a bucket seat.

The seats 14 include a seatback 24, a seat bottom 26, and a head restraint 28. The head restraint 28 may be supported by and extending upwardly from the seatback 24. The head restraint 28 may be stationary or movable relative to the seatback 24. The seatback 24 may be supported by the seat bottom 26 and may be stationary or movable relative to the seat bottom 26. The seatback 24, the seat bottom 26, and the head restraint 28 may be adjustable in multiple degrees of freedom. Specifically, the seatback 24, the seat bottom 26, and the head restraint 28 may themselves be adjustable. In other words, adjustable components within the seatback 24, the seat bottom 26, and the head restraint 28 may be adjustable relative to each other.

The seatback 24 includes the seat frame (not shown) and a covering (not numbered) supported on the seat frame. The seat frame may include tubes, beams, etc. Specifically, the seat frame includes a pair of upright frame members. The upright frame members are elongated, and specifically, are elongated in a generally upright direction when the seatback 24 is in a generally upright position. The upright frame members are spaced from each other and the seat frame includes one or move cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

As an example, the seat frame may include a seatback frame (not shown) and a seat bottom frame (not shown). Specifically, the seatback 24 may include the seatback frame and the seat bottom 26 may include the seat bottom frame. The seat frame, e.g., the seat bottom frame and the seatback frame, may include tubes, beams, etc. The seat frame may be of any suitable plastic material, e.g., carbon fiber reinforced plastic (CFRP), glass fiber-reinforced semi-finished thermoplastic composite (organosheet), etc. The seat frame may be metal. As another example, some or all components of the seatback frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seat 14 defines an occupant seating area 30. The occupant seating area 30 is the area occupied by an occupant when properly seated on the seat bottom 26 and the seatback 24. The occupant seating area 30 is in a seat-forward direction of the seatback 24 and above the seat bottom 26. In the example shown in the Figures, the occupant seating area 30 faces the front end of the passenger compartment when the seat 14 is in the forward-facing position and the occupant seating area 30 faces the rear end of the passenger compartment when the seat 14 is in the rearward-facing position.

With reference to FIGS. 2-6B, the assembly 10 includes the armrest 16 supported by the seat 14. Specifically, in the example shown in the Figures, the assembly 10 includes a pair of armrests 16 spaced in a cross-seat direction from each other. The seatback 24 and the seat bottom 26 may be between the armrests 16. In such an example, the armrests 16 are supported by the seatback 24 of the seat 14. Specifically, the armrests 16 may be supported by the seat frame of the seat 14. The armrests 16 may be supported by the seatback frame. In other examples, the armrests 16 may be supported by the seat bottom 26 of the seat 14. Specifically, the armrests 16 may be supported by the seat bottom frame. The weight an occupant places on the either of the armrests 16 when seated in the seat 14 is supported by the seat frame.

As shown in the Figures, the armrests 16 may be supported on each side of the seatback 24. Specifically, the occupant seating area 30 of the seat 14 is between the armrests 16. When an occupant is properly seated in the seat 14, the occupant has an armrest 16 to their right and an armrest 16 to their left.

The armrests 16 include an arm support portion 32 and a structural portion 34. The arm support portion 32 of the armrests 16 is supported on the seatback 24 by the structural portion 34. Specifically, the arm support portion 32 may be mounted to the structural portion 34, e.g., by fasteners, welding, etc. The arm support portion 32 is designed to support an arm of an occupant that may be seated in the seat 14. The structural portion 34 is connected to the seatback 24. Specifically, the structural portion 34 may be supported by the seat frame. The structural portion 34 may be supported by the seat frame in any suitable way at any suitable location. The structural portion 34 may be mounted to the seat frame, e.g., by fasteners, welding, etc. In some examples, such as shown in the Figures, the structural portion 34 may be supported by the seat bottom frame. In other examples, the structural portion 34 may be supported by the seatback frame.

The armrests 16 are each elongated along an axis A. Specifically, the arm support portions 32 of each of the armrests 16 is elongated along the axes A. Each of the axes A may be elongated in a generally seat-fore-and-aft direction, i.e., along a seat-longitudinal direction S. Specifically, the axes A may be elongated in the seat-fore-and-aft direction and may deviate from the seat-fore-and-aft direction at a suitable angle to support an arm of an occupant. The axes A of the armrests 16 may be spaced from each other in the cross-seat direction. The arm support portion 32 may be covered, e.g., with an upholstery, padding, etc.

The arm support portions 32 are elongated along the axes A from a first end 36 to a second end 38. The first ends 36 may be at the structural portions 34 of the armrests 16. The second ends 38 are spaced from the first ends 36 and the structural portions 34 along the axes A. In other words, the second ends 38 are spaced along the axes A in the seat-fore-and-aft direction from the structural portions 34.

The assembly 10 includes a pair of bars 18 supported by the armrests 16. Specifically, the assembly 10 includes two bars 18 supported by each armrest 16, respectively. The bars 18 may each include a pin 40 and a carrier 42 engageable with the armrest 16. Specifically, each pin 40 and carrier 42 are engageable with each armrest 16. The bars 18 extend from the pin 40 to a distal end 44 spaced from the pin 40. The armrests 16 may define a slot 80 elongated along the axes A on a bottom side of the arm support portions 32, i.e., on a bottom side of the armrests 16. In other words, the bars 18 may be supported on a side of the arm support portion 32 opposite the where an occupant may put their arm during use of the armrest 16. The pins 40 and the carriers 42 may be engageable with the slots 80 of the armrests 16.

The bars 18 are movable relative to the armrest 16 when an occupant is seated in the seat 14. Specifically, the bars 18 are translatable relative to the armrest 16 and the bars 18 are pivotable relative to the armrest 16. In other words, the bars 18 translate long the axes A of the armrests 16 and pivot about the pins 40. In some examples, the bars 18 may translate and pivot relative to the armrests 16 simultaneously. In other words, as the bars 18 are translating, the bars 18 may begin to pivot relative to the armrests 16. In other examples, the bars 18 may first rotate and later pivot relative to the armrests 16.

As discussed above, the bars 18 are translatable along the axes A. Specifically, the bars 18 are translatable in the seat-longitudinal direction S from a stowed position to a deployed position. The bars 18 are translatable in the seat-fore-and-aft direction. In the stowed position, the bar 18 is overlapping the armrest 16. In other words, in the stowed position, the bars 18 may be elongated along the axes A. Specifically, the bars 18 may be generally parallel to the arm support portion 32 in the stowed position. The distal end 44 of the bar 18 may be adjacent the second end 38 of the arm support portion 32 in stowed position and the pin 40 may be adjacent the first end 36 of the arm support portion 32 in the stowed position.

As the bars 18 move from the stowed position to the deployed position, the pin 40 and carrier 42 of the bars 18 translate relative to the armrest 16. Specifically, the pin 40 and carrier 42 of the bars 18 translate along the slot 80 of the armrest 16 from the first ends 36 of the arm support portions 32 toward the second ends 38 of the arm support portions 32 to the deployed position. The pin 40 and the carrier 42 move away from the first end 36 of the arm support portion 32 toward the second end 38 of the arm support portion 32 as the bar 18 moves toward the deployed position.

In the deployed position, the pins 40 may be at a translational distance T from the stowed position, i.e., from the first end 36 of the arm support portion 32. The translational distance T may be a distance corresponding to a size of an occupant properly seated in the seat 14. In other words, the translational distance T from the stowed position to the deployed position is based on the size of the occupant properly seated in the seat 14.

The size of the occupant may be determined by size sensors 46 in the vehicle 12. The size of the occupant may be determined based on weight data, visual data from cameras, etc. The size of the occupant may be broken down into categories based on ranges of weight. For example, range one may include occupants between 0-50 lbs., range two may include occupants from 50-100 lbs., and range three may include occupants above 100 lbs. The three weight ranges described herein are exemplary, and a greater or fewer number of ranges, as well as ranges of different scope, may be used. In another example, determining the size of the occupant may be a binary determination, for example if the occupant is above a threshold weight, i.e. 80 lbs.

The translational distance T may be shorter when the occupant is a smaller occupant and may be a greater distance when the occupant is a larger occupant. In other words, the bar 18 is spaced from the seatback 24 in the deployed position. The occupant seating area 30 is between the seatback 24 and the bars 18 when the bars 18 are in the deployed position. The bars 18 are seat-forward of the occupant when the bars 18 are in the deployed position.

As discussed above, the bars 18 are pivotable relative to the armrest 16. The bars 18 may be pivoted from a non-pivoted position to a pivoted position. Specifically, the bars 18 are pivotable about the pins 40 as the bars 18 move toward the pivoted position. In some examples, such as shown in the Figures, the bars 18 may begin moving from the non-pivoted position toward the pivoted position during the translational movement of the bar 18 along the armrest 16. In other words, the bars 18 both translate to the deployed position and pivot toward the pivoted position simultaneously. In other examples, the bars 18 may remain in the non-pivoted position until the bars 18 reach the deployed position. In such examples, the bars 18 move to the pivoted position when the bars 18 reach the deployed position.

In the non-pivoted position, the bars 18 are elongated along the armrests 16, i.e., generally parallel with the armrest 16. As the bars 18 move toward the pivoted position, the bars 18 pivot in a cross-seat direction. Specifically, the bars 18 pivot in a seat-inboard direction from the non-pivoted position toward the pivoted position. In other words, the bars 18 pivot toward a center of seat 14 until the bars 18 reach the pivoted position.

In the pivoted position, the bars 18 extend across a lap of an occupant of the seat 14 from one side of the seat 14 to the other side of the seat 14. Specifically, the occupant seating area 30 is between the seatback 24 and the bars 18 when the bars 18 is in the pivoted position. As stated above, the occupant seating area 30 is between the seatback 24 and the bar 18 when the bar 18 is in the deployed position. In other words, the bars 18, in the deployed and the pivoted position, are spaced from the seatback 24 and the occupant seating area 30 is between the bars 18 and the seatback 24. The bars 18 are seat-forward of the occupant when the bars 18 are in the deployed position and the pivoted position.

In the pivoted position, the distal ends 44 of the bars 18 are adjacent each other in the cross-seat direction. The distal ends 44 of the bars 18 meet at a joint 56 between the bars 18. In other words, as the bars 18 move toward the pivoted position, the bars 18 converge toward each other at the joint 56. The joint 56 is spaced seat-forward from the seatback 24. Specifically, the occupant seating area 30 is between the joint 56 and the seatback 24. The joint 56 is seat-forward of the occupant seated in the seat 14.

The bars 18 may move to the deployed position and the pivoted position based on an identification of an occupant being seated in the seat 14. For example, the vehicle 12 may include size sensors 46, e.g., a weight sensor, cameras, etc., that identify when an occupant is seated in the seat 14 of the vehicle 12. In the event an occupant is identified in the seat 14, the bars 18 may move to the deployed position and the pivoted position.

Figure 2A:
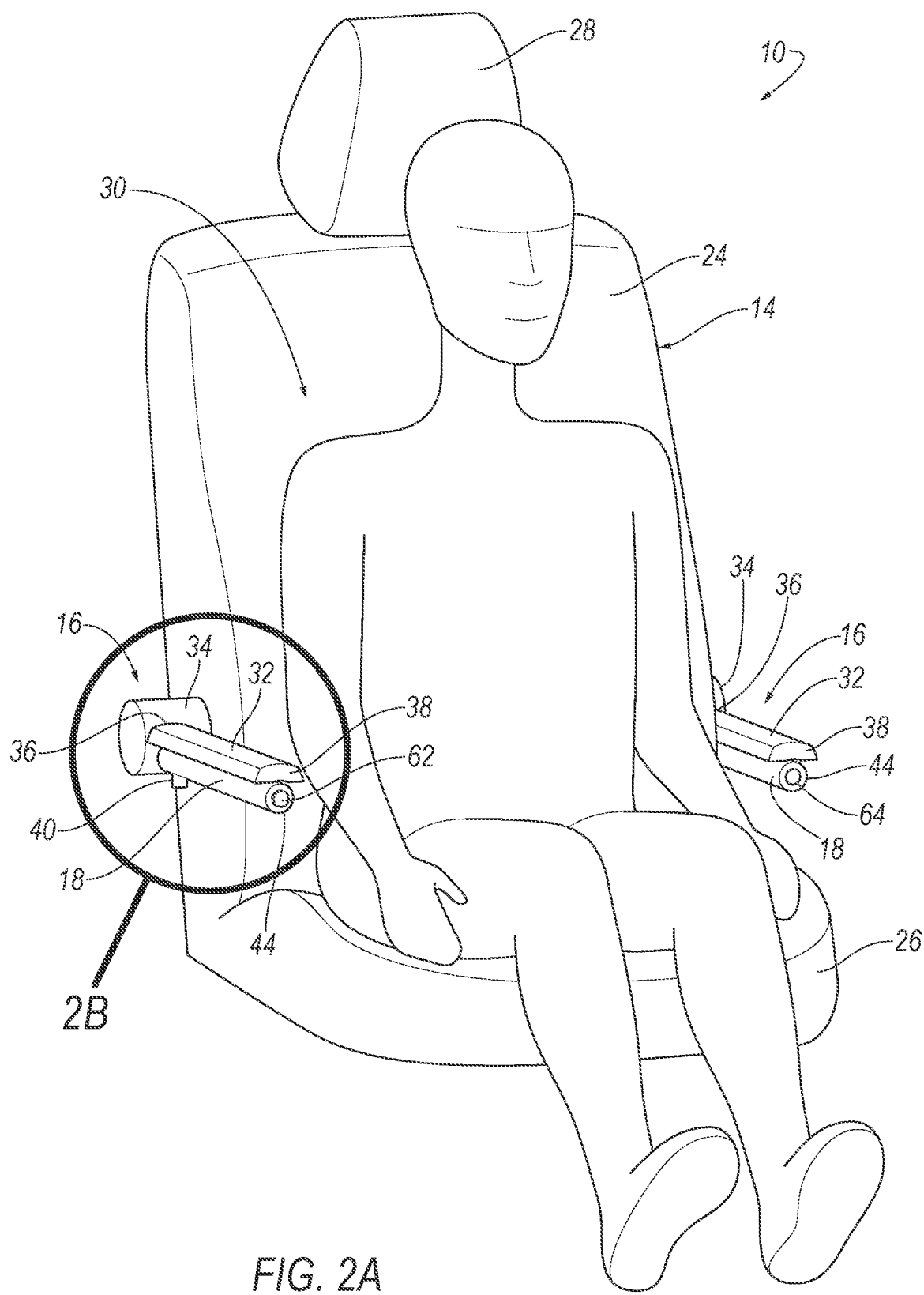
FIG. 2A is a perspective view of a vehicle seat having an armrest.
Figure 2B:
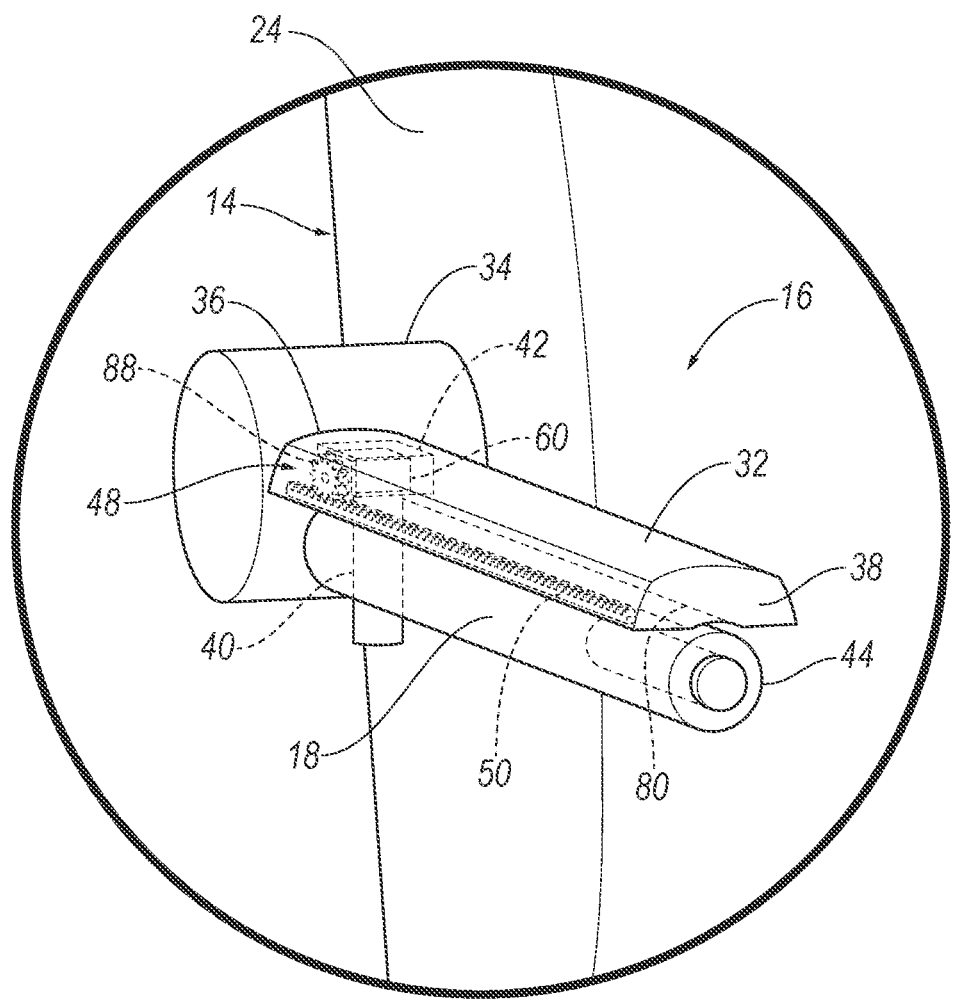
FIG. 2B is a perspective view of the armrest and a bar supported by the armrest in a stowed position and a non-pivoted position.
Figure 3A:
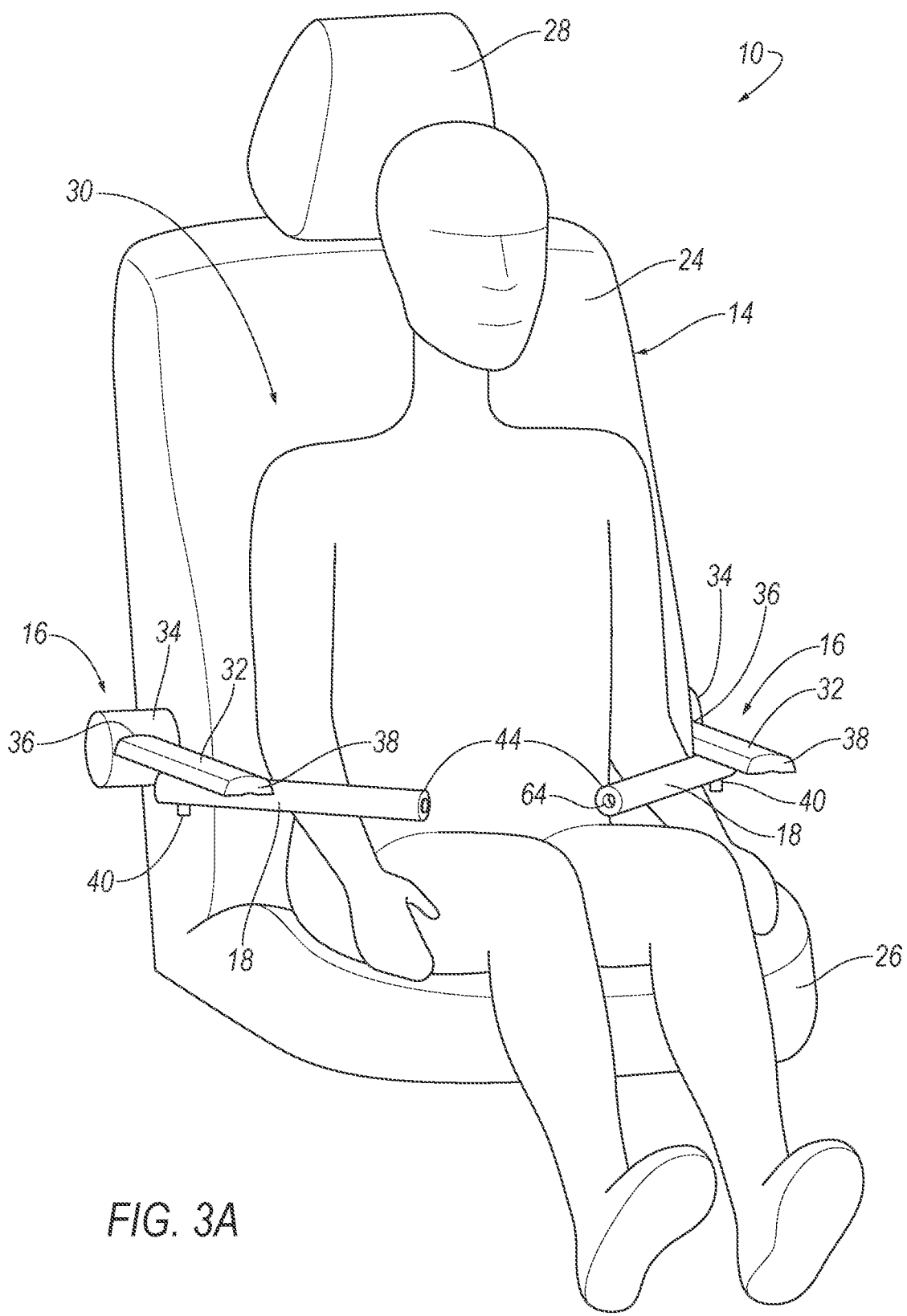
FIG. 3A is a perspective view of the vehicle seat with the bar moving toward a deployed position and a pivoted position.
Figure 3B:
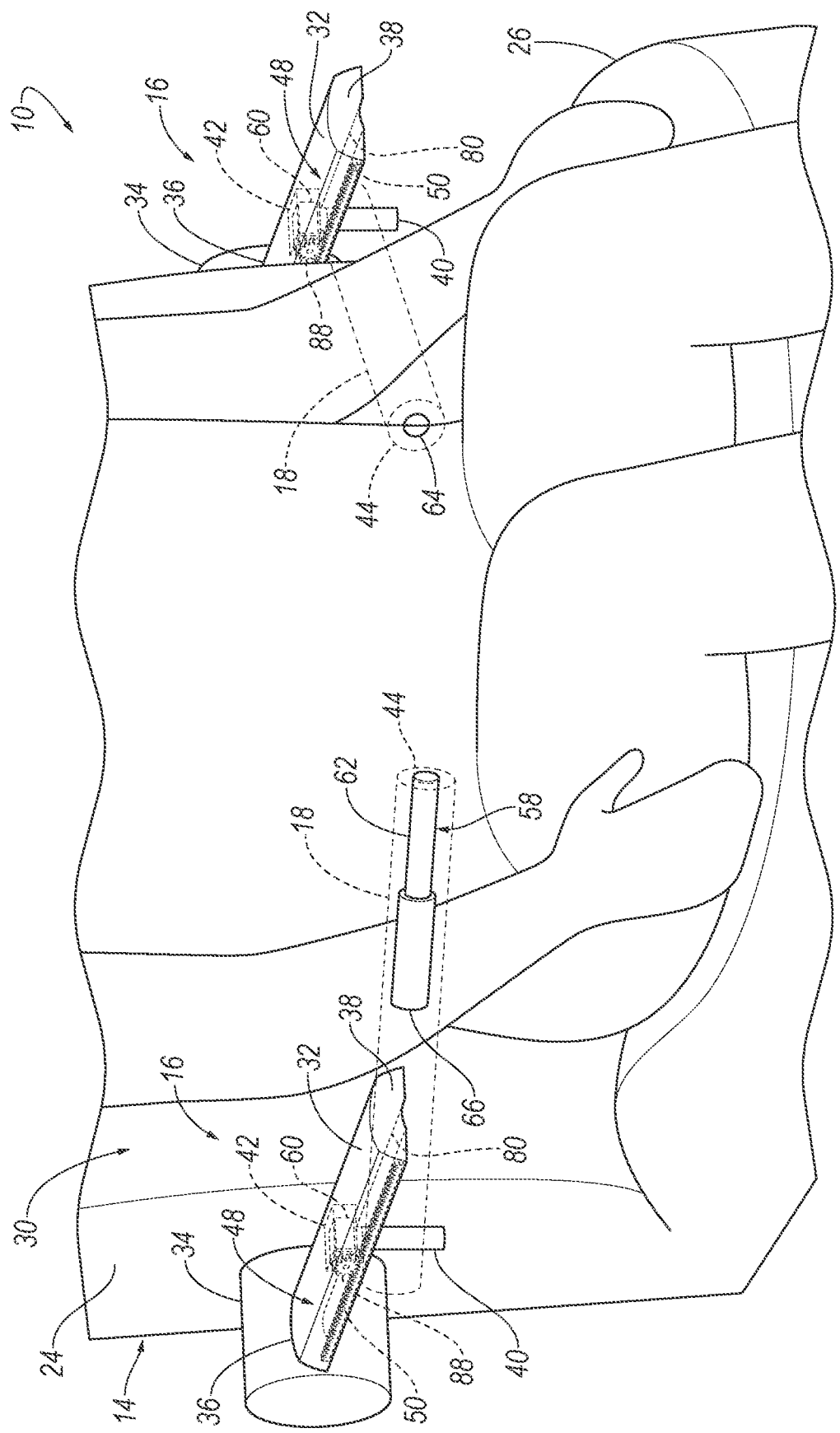
FIG. 3B is a perspective view of the view shown in FIG. 3A of the bars moving toward the deployed position and the pivoted position with the bars having a lock.
Figure 4A:
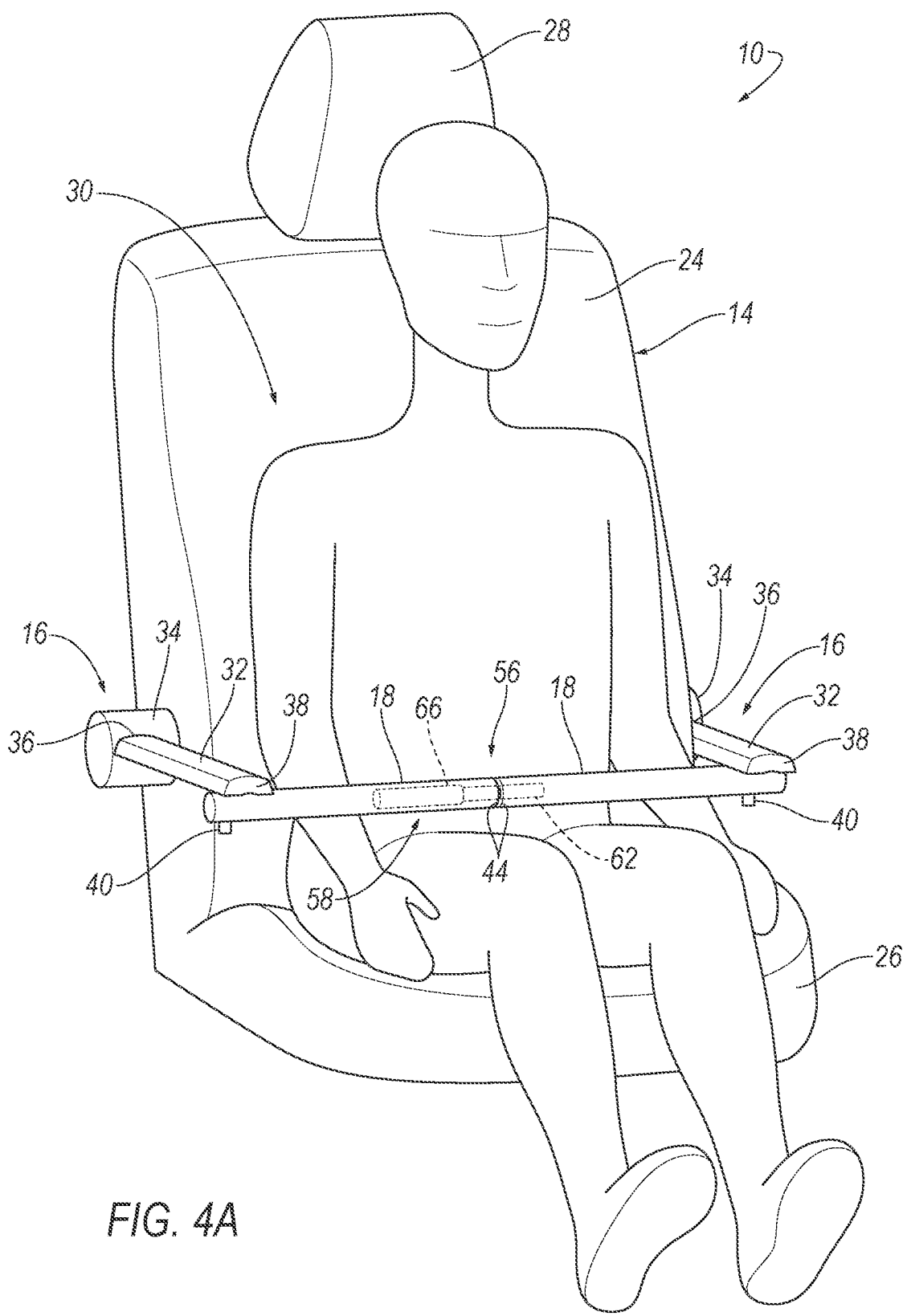
FIG. 4A is a perspective view of the vehicle seat with the bars in the deployed position and the pivoted position and the lock engaged.
Figure 4B:
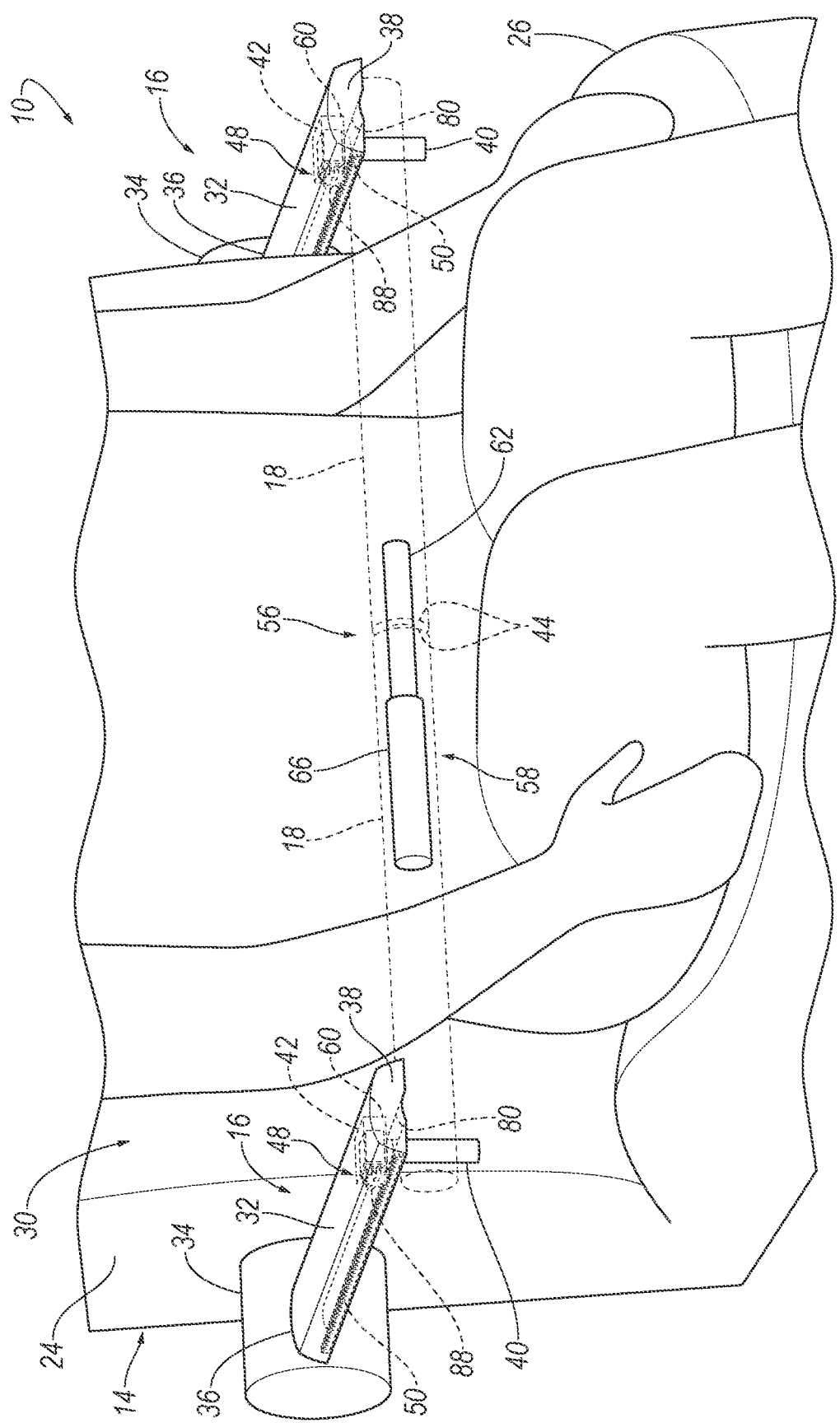
FIG. 4B is a perspective view of the vehicle seat shown in FIG. 4A with the bars in the deployed position and the pivoted position and the lock engaged.

With reference to FIG. 2B, the assembly 10 may include one or more linear actuators 48 fixed to one or more of the bars 18 and drivably coupled to the pin 40 to slide the bars 18 along the armrests 16. The assembly 10 may include a linear actuator 48 coupled to the carrier 42 of the bars 18 in the slot 80 to move the bars 18 along the axis A. The linear actuator 48 may include a rack 50 and pinion 88 to move the bars 18 along the armrests 16. In the example shown in the Figures, the linear actuator 48 may include a motor 52 that rotates the pinion 88 to move the pinion 88 along the rack 50, and in turn, moving the bars 18 along the armrests 16 to the deployed position. In other examples, the linear actuator 48 may be any suitable type of linear actuator 48, e.g., a drive screw, etc. A position sensor 54 may determine the translational distance T along the armrest 16 to stop the translation of the bar 18 at the deployed position.

A second motor 60 may be coupled to the pins 40 of the bars 18 to rotate the pin 40. The second motor 60 rotates the pin 40 to move the bars 18 from the non-pivoted position to the pivoted position. The second motor 60 may drive gears (not shown) to rotate the pins 40 and pivot the bars 18 from the non-pivoted position to the pivoted position. The second motor 60 may be any suitable motor to move the bars 18 from non-pivoted position to the pivoted position.

The bars 18 are connectable to each other at the joint 56. Specifically, the bars 18 are lockable in the pivoted position. Specifically, the assembly 10 includes a lock 58 between the bars 18. In the pivoted position, the bars 18 are lockable to each other to maintain the bars 18 in the pivoted position. The lock 58 includes a post 62 supported by one of the bars 18. The post 62 may be movable relative to the bars 18. The other of the bars 18 may define a hole 64. When the bars 18 are in the pivoted position, the post 62 may move to be receivable by the other of the bars 18. Specifically, the post 62 moves into the hole 64 and the bars 18 are connected and locked to each other. In some examples, such as shown in the Figures, the lock 58 may be a solenoid 66. In such an example, the solenoid 66 includes the post 62. In other examples, the bars 18 that supports the post 62 may include a motor 52 (not shown) that moves the post 62 into and out of the hole 64.

The assembly 68 may include at least one proximity sensor 82 supported by the bars 18. The proximity sensor 82 may determine whether the bars 18 are in the deployed position and the pivoted position, i.e., a position to be locked together. Specifically, the proximity sensors 82 may determine that the bars 18 have reached a threshold distance from each other to move the post 62 of the lock 58 into the hole 64. In other words, the proximity sensors 82 may determine that the bars 18 have translated and pivoted to the deployed position and the pivoted position and have reached the joint 56. The proximity sensor 82 may be any suitable type of sensor, e.g., a camera, a laser, etc., to determine that the bars 18 have reached the pivoted position.

When the occupant of the seat 14 plans to exit the seat 14, the post 62 may be removed from the hole 64 to allow the bars 18 to move away from the pivoted position and the deployed position toward the non-pivoted and stowed position. Once the bars 18 reach the non-pivoted and stowed position, the occupant is able to leave the seat 14 and/or the vehicle 12.

With reference to FIGS. 5A-6B, the assembly 10 includes one or more airbag assemblies 68. The airbag assembly 68 includes the airbag 20, an inflator 70, and may include a housing (not shown). The assembly 10 may include any suitable number of airbag assemblies 68. In examples including more than one airbag assembly 68, the airbag assemblies 68 may be identical or substantially identical to each other.

The assembly 10 may include one or more airbags 20 inflatable from an uninflated position to an inflated position in the event of an impact to the vehicle 12. In the example shown in FIGS. 5A and 5B, the assembly 10 includes one airbag 20 supported by one of the bars 18. In the example shown in FIGS. 6A and 6B, the assembly 10 includes two airbags 20 with one airbag 20 supported by one of the bars 18 and a second airbag 20 supported by the other of the bars 18. In both examples, the airbags 20 are inflatable from the bars 18 to the inflated position when the bars 18 are in the deployed position and the pivoted position. In other words, the airbags 20 are inflatable when the bars 18 are connected and locked to each other. Specifically, the airbags 20 are inflatable along the bars 18 to the inflated position when the bars 18 are in the deployed position, the pivoted position, and are locked and connected to each other.

The airbags 20 may be of a cylindrical shape about the bars 18. Specifically, the airbags 20 surround the bars 18 in the inflated position. Specifically, the airbags 20 may define a cylindrical cavity within which the bars 18 are elongated through.

The airbags 20 use the bars 18 as a reaction surface in the event of an impact to the vehicle 12. The occupant seating area 30 is between the airbags 20 and the seatback 24 when the airbags 20 are in the inflated position. Specifically, the airbags 20 may extend into the occupant seating area 30 in the inflated position to control the kinematics of the occupant in the event of an impact to the vehicle 12.

Figure 5A:
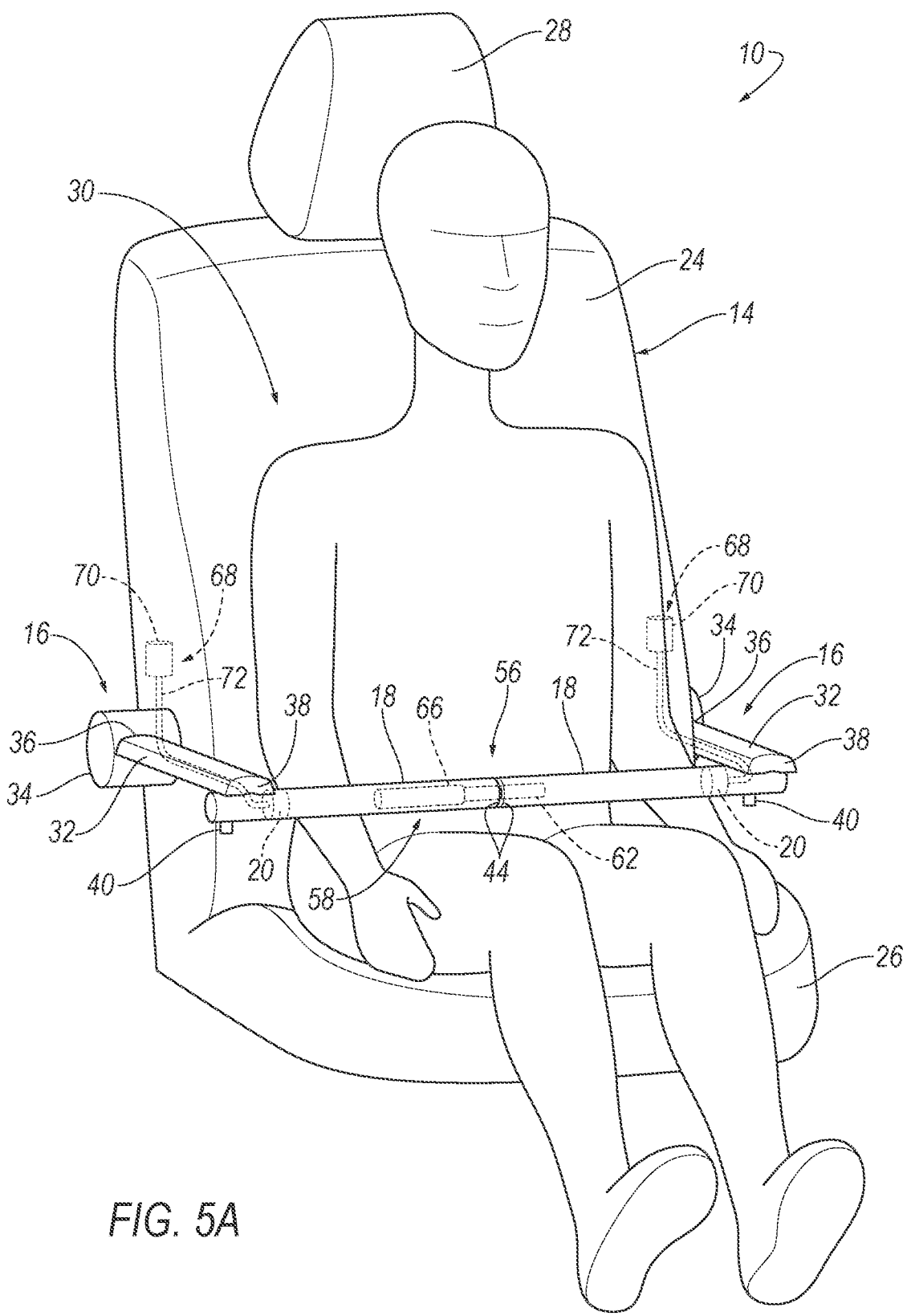
FIG. 5A is a perspective view of a first example of the vehicle seat with a pair of airbags in an uninflated position, the airbags being supported by the bars, respectively.
Figure 5B:
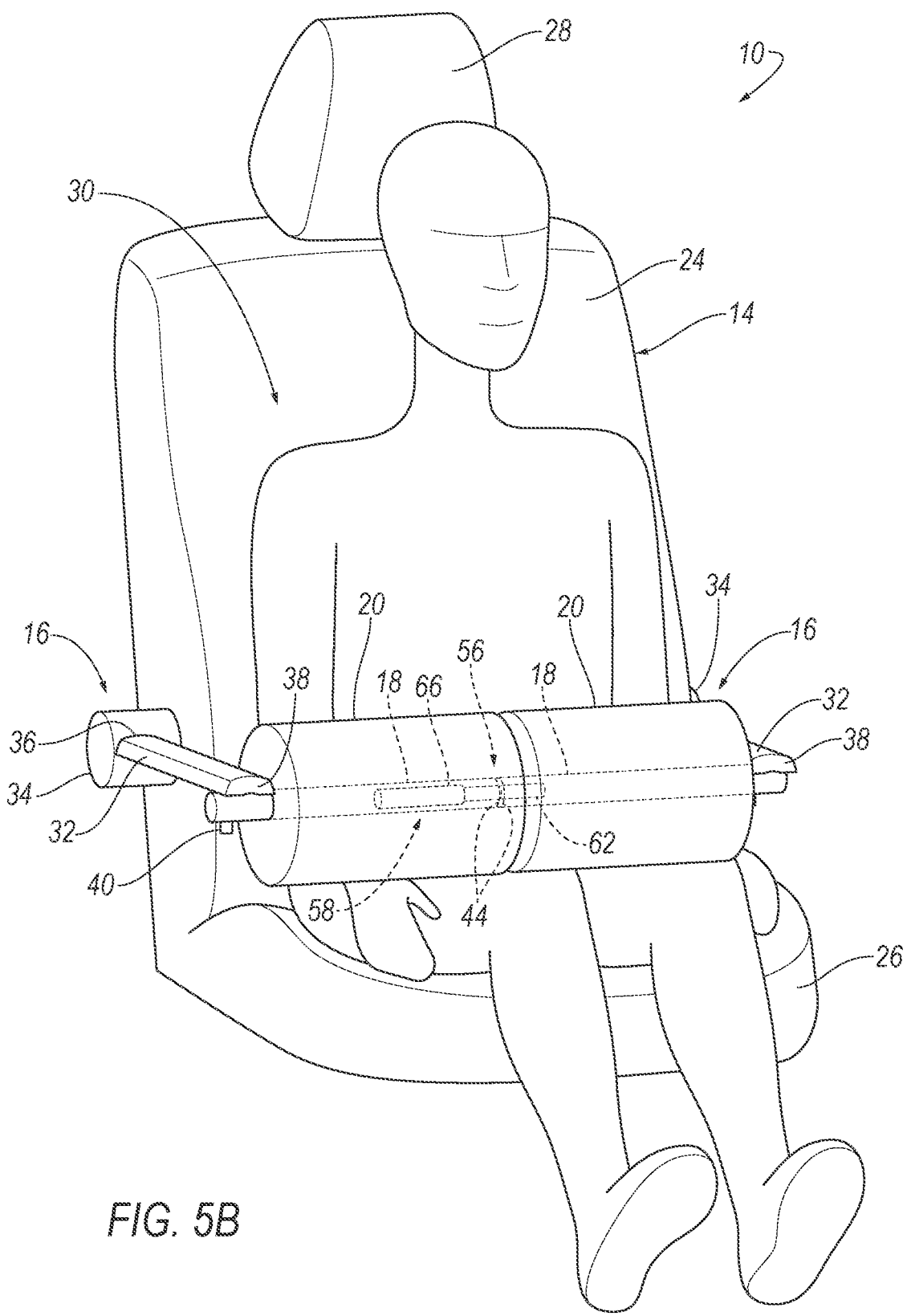
FIG. 5B is a perspective view of the first example of the vehicle seat with the pair of airbags in an inflated position, the airbags being supported by the bars, respectively.

In the example shown in FIGS. 5A and 5B, as discussed above, the assembly 10 includes one airbag 20 supported by one of the bars 18. In such an example, the airbag 20 is inflatable along both of the bars 18 from the uninflated position to the inflated position. In the uninflated position, the airbag 20 is supported adjacent one of the armrests 16. In other words, the airbag 20 is supported by the bar 18 at a position spaced from the distal ends 44 and the joint 56 between the bars 18. The bars 18 may define a recess (not numbered) that the airbag 20 fits into when the airbag 20 is in the inflated position. The airbag 20 may be covered by a trim cover, e.g., plastic cover, cloth covering, etc., that includes a tear seam that is frangible when the airbag 20 inflates. In other words, the tear seam breaks as the airbag 20 moves to the inflated position to control the kinematics of the occupant of the seat 14.

With continued reference to FIGS. 5A and 5B, as the airbag 20 moves toward the inflated position, the airbag 20 inflates away from the armrest 16 of which it is adjacent and toward the other armrest 16 until the airbag 20 is in the inflated position. In the inflated position, the airbag 20 is elongated from one armrest 16 to the other armrest 16. In other words, in the inflated position, the airbag 20 extends from one armrest 16 to the other armrest 16. In examples including one airbag 20, the airbag 20 is elongated over the joint 56 of the bars 18 when the airbag 20 is in the inflated position. In other words, the joint 56 between the bars 18 is not visible when the airbag 20 is in the inflated position and the airbag 20 overlaps the distal ends 44 and the joint 56.

Figure 6A:
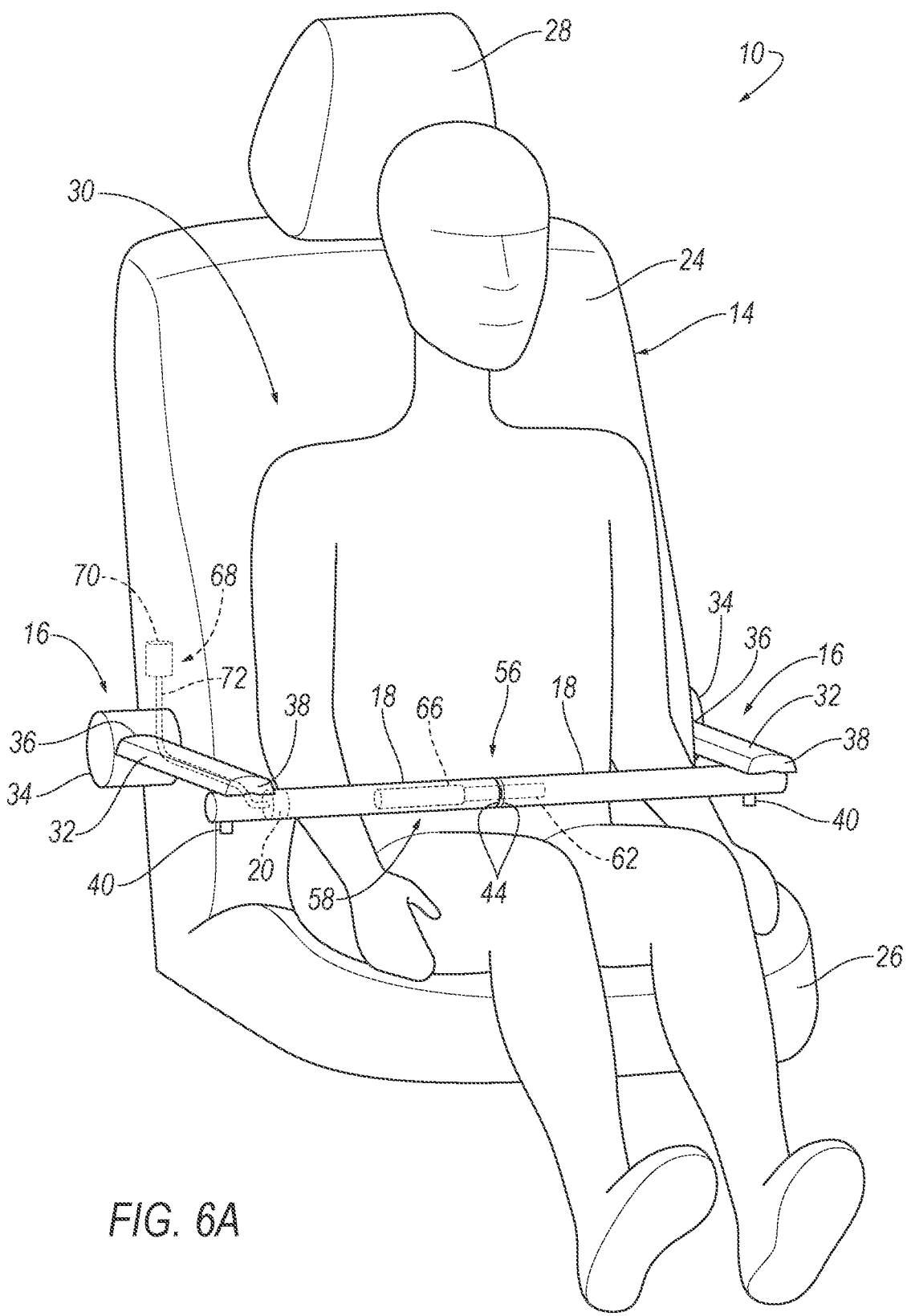
FIG. 6A is a perspective view of a second example of the vehicle seat with a single airbag in an uninflated position supported by one of the bars.
Figure 6B:
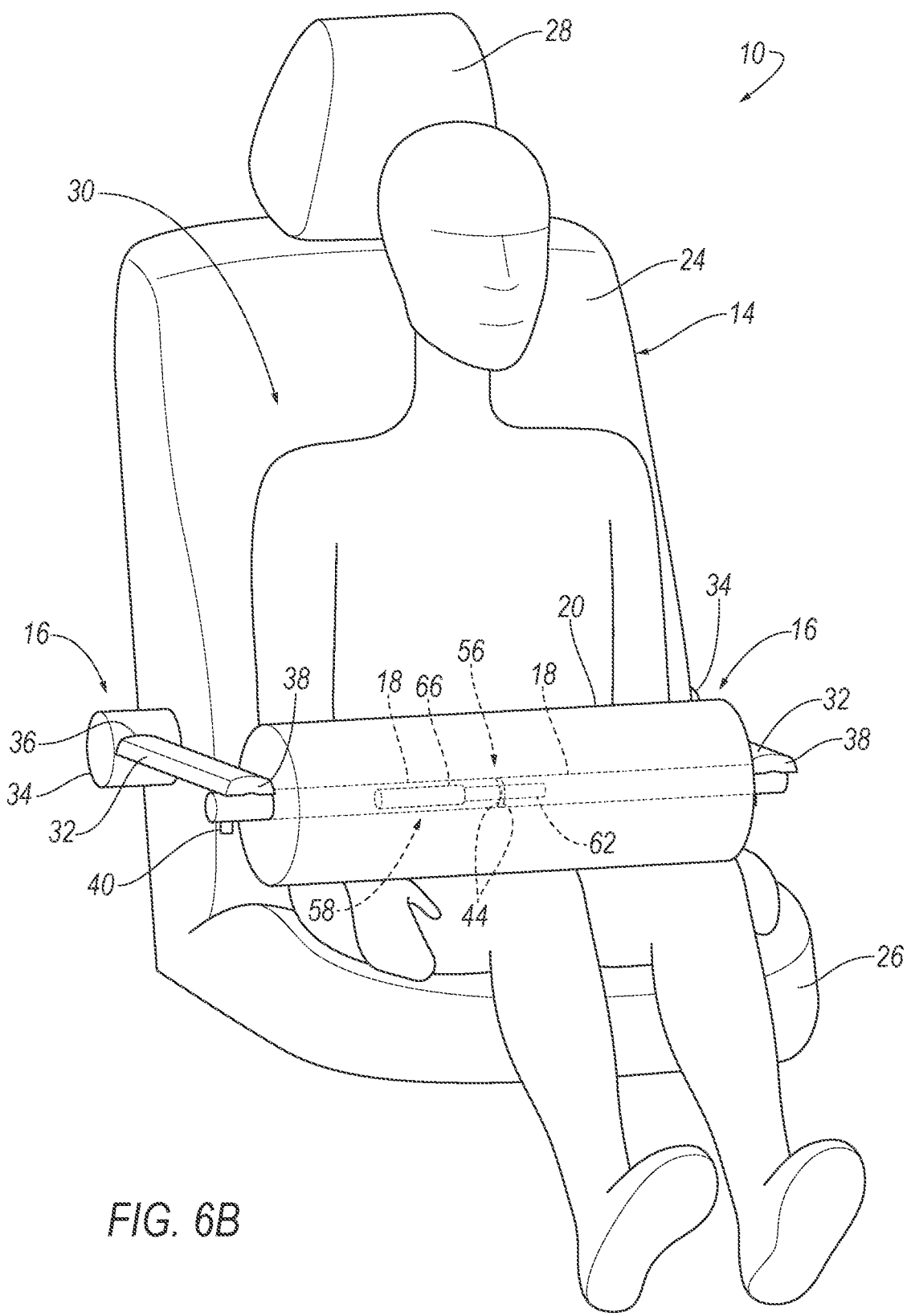
FIG. 6B is a perspective view of a second example of the vehicle seat with a single airbag in an inflated position supported by one of the bars.

In the example shown in FIGS. 6A and 6B, as discussed above, the assembly 10 includes two airbags 20. In such an example, one of the airbags 20 is supported by one of the bars 18 and the other of the airbags 20 is supported by the other of the bars 18. In other words, each bar 18 supports one of the airbags 20. Specifically, the airbags 20 are supported by the bars 18 adjacent the armrests 16. In other words, the airbags 20 are supported by the bars 18 at positions spaced from the distal ends 44 of the bars 18 and the joint 56. The airbags 20 are supported by the bars 18 at positions spaced from each other.

With continued reference to FIGS. 6A and 6B, each of the airbags 20 is inflatable along the bar 18 of which the airbag 20 is supported toward the distal ends 44. As the airbags 20 move toward the inflated positions, the airbags 20 inflate away from the armrests 16 and toward each other. In other words, the airbags 20 inflate away from the armrests 16 and toward the distal ends 44 of the bars 18 and the joint 56. The airbags 20 meet at the joint 56 in the inflated position.

The inflator 70 is fluidly connected to the airbag 20. The inflator 70 expands the airbag 20 with inflation medium, such as a gas, to move the airbag 20 from the uninflated position to the inflated position. The inflator 70 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag assembly 68 includes a fill tube 72 extending from the inflator 70 to the airbag 20. If the assembly 10 includes more than one airbag 20 airbag 20, for example as shown in FIGS. 6A and 6B, the assembly 10 may include one or more inflators 70 that are connected to the airbags 20 to move the airbags 20 from the uninflated position to the inflated position. In such examples, the airbag assembly 68 includes one or more fill tubes 72 to inflate the airbags 20 with inflation medium.

The airbag 20, or in the example of multiple airbags 20, the airbags 20, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The vehicle 12 may include at least one impact sensor 74 for sensing impact to the vehicle 12, and the computer 76 may be in communication with the impact sensors 74. The impact sensor 74 is configured to detect an impact to the vehicle 12. The impact sensor 74 may be of any suitable type, for example, post 62-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 74 may be located at numerous points in or on the vehicle 12.

The computer 76 includes a processor and a memory. The memory includes one or more forms of computer 76 readable media, and stores instructions executable by the computer 76 for performing various operations, including as disclosed herein. The controller may be, for example, a restraints control module. In another example, a computer 76 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a computer 76 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 76. The memory may be of any type, e.g., hard disk drives, solid state drives, servers, or any volatile or non-volatile media. The memory may store the collected data sent from the sensors. The memory may be a separate device from the computer 76, and the computer 76 may retrieve information stored by the memory via a network in the vehicle 12, e.g., over a CAN bus, a wireless network, etc. Alternatively or additionally, the memory may be part of the computer 76, e.g., as a memory of the computer 76. The computer 76 may include programming to operate one or more of vehicle 12 brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 76, as opposed to a human operator, is to control such operations. Additionally, the computer 76 may be programmed to determine whether and when a human operator is to control such operations. The computer 76 may include or be communicatively coupled to, e.g., via a vehicle 12 network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc.

Figure 7:
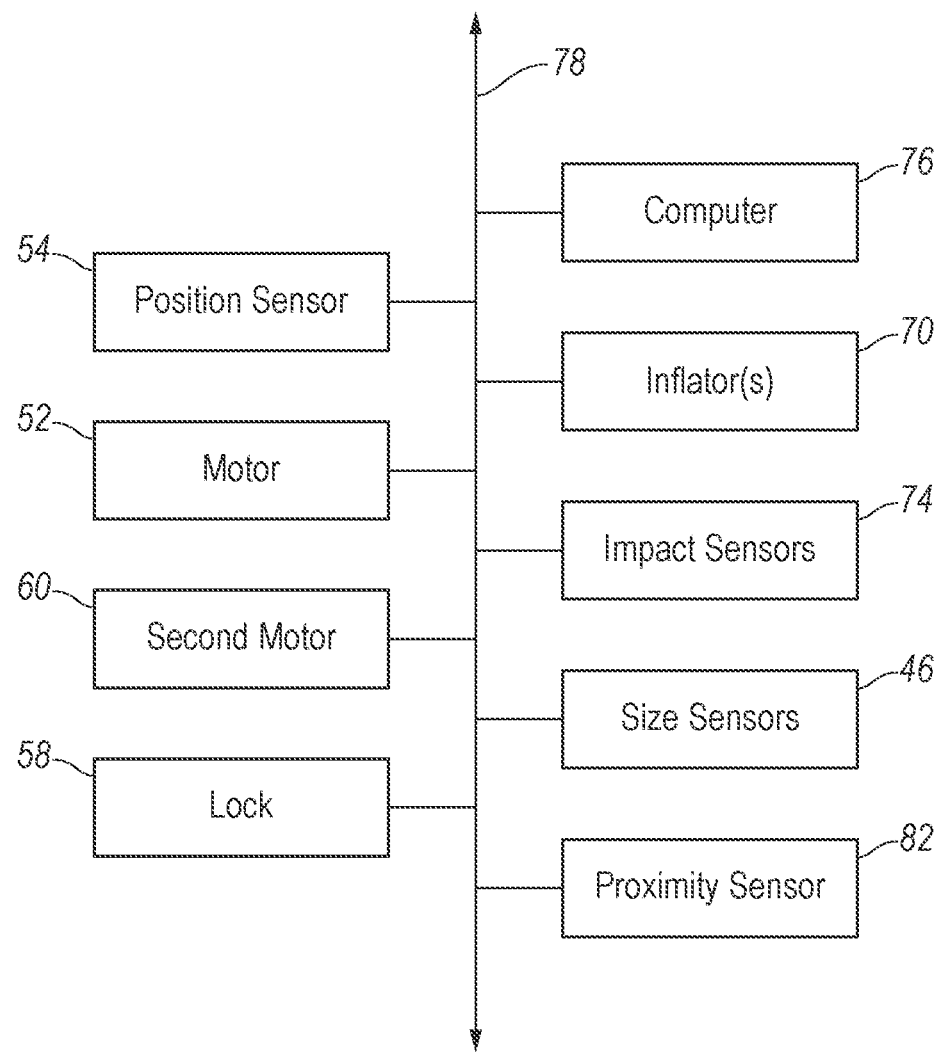
FIG. 7 is a block diagram of a vehicle communication network of the vehicle.

With reference to FIG. 7, the computer 76 is generally arranged for communications on a vehicle communication network 78 that may include a bus in the vehicle 12 such as a controller area network CAN or the like, and/or other wired and/or wireless mechanisms. Alternatively or additionally, in cases where the computer 76 actually comprises a plurality of devices, the vehicle communication network 78 may be used for communications between devices represented as the computer 76 in this disclosure. Further, as mentioned below, various controllers and/or sensors may provide data to the computer 76 via the vehicle communication network 78.

Figure 8:
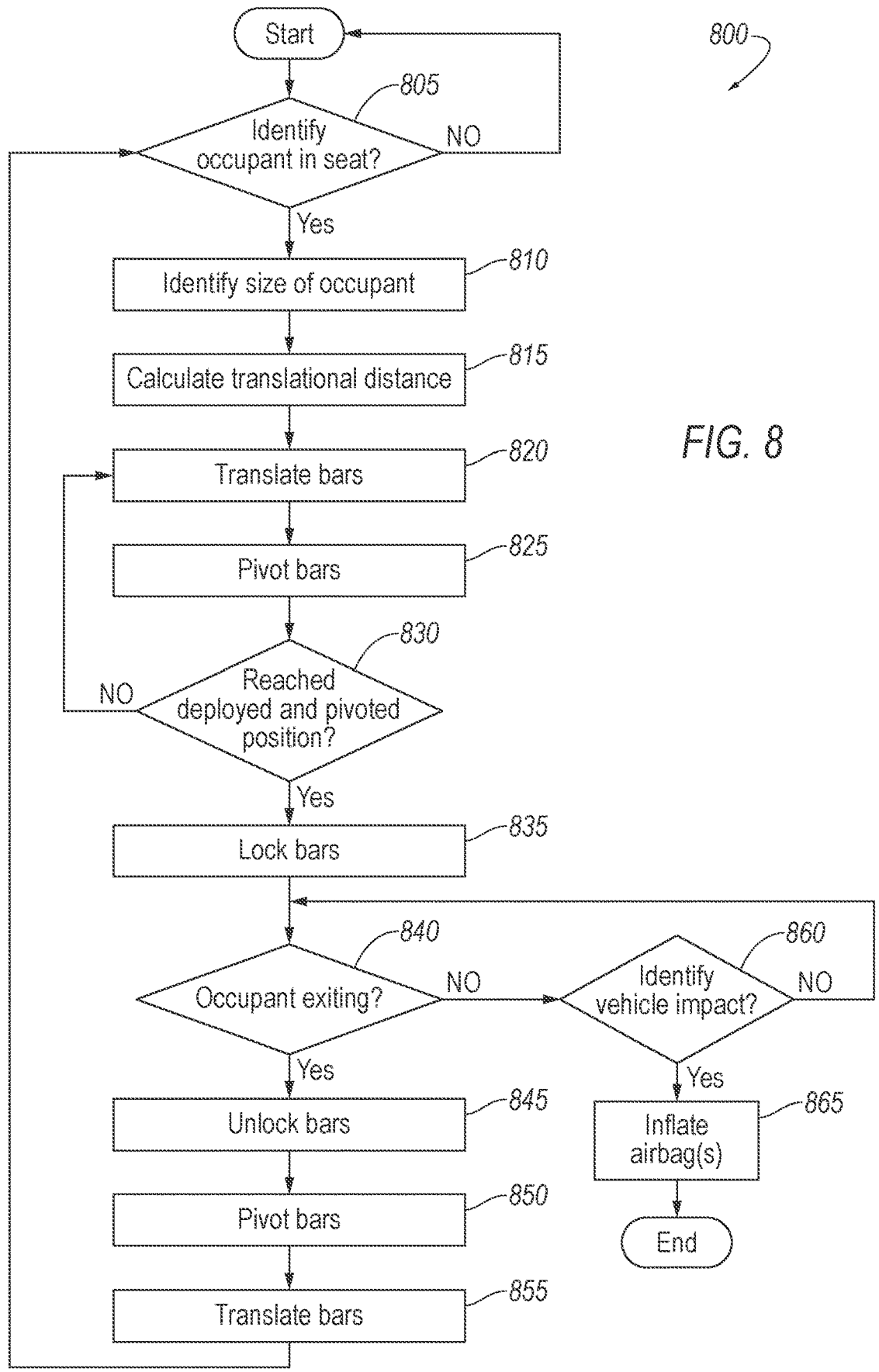
FIG. 8 is a flowchart of a method including instructions executable by a vehicle computer.

With reference to FIG. 8, the vehicle 12 computer 76 stores instructions to control components of the vehicle 12 according to the method 800. Specifically, as shown in FIG. 8, the method 800 includes moving the bars 18 of the assembly 10 based on identification of an occupant seated in the seat 14. Use of "in response to," "based on," and "upon determining" herein, including with reference to method 800, indicates a causal relationship, not merely a temporal relationship.

With reference to decision block 805, the method 800 includes identifying an occupant is seated in the seat 14. The size sensor 46, e.g., a weight sensor or camera as described above, may be in communication with the computer 76 to identify an occupant is seated in the seat 14. If no occupant is identified as being seated in the seat 14, the method 800 returns to the start. If an occupant is identified in the seat 14, the method 800 moves to block 810.

With reference to block 810, the method 800 includes identifying the size of the occupant. The size sensors 46 of the vehicle 12 determine the size of the occupant, e.g., weight, height, body type, percentile, etc.

With reference to block 815, based on the size of the occupant, the method 800 include calculating the translational distance T to determine the deployed positions of the bars 18. As discussed above, the translational distance T may be shorter for smaller occupants or longer for larger occupants.

With reference to block 820, based on the calculated translational distance T, the method 800 includes actuating the linear actuators 48 to translate the bars 18 to the deployed positions. The linear actuators 48 move the bars 18 along the translational distance T to the deployed positions.

With reference to block 825, the method 800 includes actuating the second motors 60 to pivot the bars 18 to the pivoted position. The second motors 60 rotate the pins 40 of the bars 18 to rotate the bars 18 toward the pivoted position. The bars 18 extend across the lap of the occupant of the seat 14 in the pivoted and deployed position. Block 820 and block 825 may both be initiated simultaneously or block 820 may be initiated after the completion of block 825.

With reference to decision block 830, the method 800 includes determining the bars 18 have reached the deployed position and the pivoted position. The proximity sensor 82 may send a signal to the computer indicating that the bars 18 have reached the deployed position and the pivoted position. If the bars 18 have not reached the deployed position and pivoted position, the method 800 returns to block 820. If the bars 18 have reached the deployed position and the pivoted position, the method 800 moves to block 835

With reference to block 835, based on the bars 18 reaching the pivoted position, the method 800 includes activating the lock 58 of the bars 18 to connect the bars 18 and lock 58 the bars 18 in the pivoted position. In examples wherein the lock 58 is a solenoid 66, the method 800 includes activating the solenoid 66. The post 62 supported by one of the bars 18 moves into the hole 64 of the other of the bars 18.

With respect to decision block 840, the method 800 includes determining whether the occupant is exiting the seat 14. In some examples, the occupant may indicate manually that the occupant is exiting the seat 14, e.g., by activating a button or switch supported by any suitable component of the vehicle 12, such as the seat 12 or an instrument panel. In other examples, sensors may indicate that the occupant is exiting the seat 14, e.g., by cameras, weight sensors, etc. In response to determining the occupant is exiting the seat 14, the method 800 moves to block 845. If the occupant is not determined to be exiting the seat 14, the block moves to block 860.

With respect to block 845, in response to determining the occupant is exiting the seat 14, the method 800 includes activating the lock 58 to unlock the lock 58. The post 62 of the lock 58 is removed from the hole 64 and the bars 18 are able to move from the pivoted position.

With respect to block 850, the method 800 includes activating the second motors 60 to pivot the bars 18 from the pivoted position to the non-pivoted position. The second motor 60 rotates the pin 40 to pivot the bars 18 to the non-pivoted position.

With respect to block 855, the method 800 includes activating linear actuators 48 to translate the bars 18 from the deployed position to the stowed position. Block 850 and block 850 may both be initiated simultaneously or block 855 may be initiated after the completion of block 850. After the bars 18 translate, the method 800 returns to decision block 805 to identify whether an occupant is seated in the seat 14.

With respect to decision block 860, in response to determining the occupant is not exiting the vehicle 12, the method 800 includes identifying whether an impact has occurred to the vehicle 12. In the event of an impact, the impact sensors 74 communicate the occurrence of the impact to the computer 76. If an impact is identified, the method 800 moves to block 865. If no impact is identified, the method 800 returns to decision block 840 to determining whether the occupant is exiting the seat 14.

With respect to block 865, the method 800 includes inflating the airbag 20 or airbags 20, depending on the number of airbags 20, to the inflated position. The inflator 70 passes inflation medium through the fill tubes 72 to inflate the one or more airbags 20 to the inflated position. The method 800 ends after the inflation of the airbag 20 or airbags 20.

The numerical adverbs "first" and "second" are used herein merely as identifiers and do not signify order or importance.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat;
   an armrest supported by the seat, the armrest elongated along an axis;
   a bar supported by the armrest, the bar being translatable along the axis from a stowed position overlapping the armrest to a deployed position extended from the armrest;
   the bar being pivotable relative to the armrest in a seat-inboard direction from a non-pivoted position to a pivoted position; and
   an airbag supported by the bar, the airbag being inflatable from the bar to an inflated position when the bar is in the deployed position and the pivoted position.

2. The assembly of claim 1, further comprising:
   a second armrest supported by the seat, the second armrest spaced in a cross-seat direction from the armrest and the second armrest being elongated along a second axis spaced from the axis;
   a second bar supported by the second armrest, the second bar being translatable along the second axis from a stowed position overlapping the second armrest to a deployed position; and
   the second bar being pivotable relative to the second armrest in a seat-inboard direction from a non-pivoted position to a pivoted position.

3. The assembly of claim 2, wherein the airbag is inflatable along the bar and the second bar to an inflated position when the bar and the second bar are each in the deployed position and the pivoted position, the airbag surrounding the bar and the second bar in the inflated position.

4. The assembly of claim 2, wherein the airbag extends from the armrest to the second armrest when the airbag is in the inflated position.

5. The assembly of claim 2, further comprising a second airbag supported by the second bar, the second airbag being inflatable along the second bar to an inflated position when the second bar is in the deployed position and the pivoted position.

6. The assembly of claim 2, wherein distal ends of the bar and the second bar are adjacent each other in the cross-seat direction at a joint, the bar and the second bar being connectable to each other at the joint.

7. The assembly of claim 6, further comprising a lock between the bar and the second bar, the bar and the second bar being connectable to each other by the lock.

8. The assembly of claim 7, wherein the lock is a solenoid including a post movable along the bar and receivable by the second bar.

9. The assembly of claim 1, wherein the bar includes a pin engageable with the armrest, the bar being pivotable about the pin to the pivoted position.

10. The assembly of claim 9, wherein the pin is translatable along the armrest to the deployed position.

11. The assembly of claim 10, wherein the armrest defines a slot elongated along the axis, the pin being translatable along the slot to the deployed position.

12. The assembly of claim 1, wherein the bar includes a pin translatable along the armrest to the deployed position.

13. The assembly of claim 12, wherein the armrest defines a slot elongated along the axis, the pin being translatable along the slot to the deployed position.

14. The assembly of claim 1, wherein the bar is translatable in a seat-longitudinal direction from the stowed position to the deployed position.

15. The assembly of claim 1, wherein the bar is lockable in the pivoted position.

16. The assembly of claim 1, wherein the seat defines an occupant seating area, the occupant seating area being between the seat and the bar when the bar is in the pivoted position and the deployed position.

17. A computer including a processor and a memory storing instructions executable by the processor to:
   identify an occupant is seated in a seat of a vehicle;
   identify a size of the occupant;
   translate a bar supported by an armrest of a seat a translational distance from a stowed position to a deployed position, the translational distance from the stowed position to the deployed position being based on the size of the occupant of the seat; and
   pivot the bar in a seat-inboard direction to a pivoted position when the bar is in the deployed position along the armrest.

18. The computer of claim 17, further comprising instructions to:
   translate a second bar supported by a second armrest of the seat from a stowed position to a deployed position, the translational distance from the stowed position to the deployed position being based on the size of the occupant of the seat; and
   pivot the second bar in the seat-inboard direction to a pivoted position when the bar is in the deployed position along the second armrest.

19. The computer of claim 18, wherein the bar is lockable to the second bar.

20. The computer of claim 17, further comprising instructions to:
   identify an impact to the vehicle; and
   inflate an airbag supported by the bar, the airbag being inflatable along the bar to an inflated position when the bar is in the deployed position and the pivoted position.

* * * * *